United States Patent [19]

Hart

[11] Patent Number: 4,542,864

[45] Date of Patent: Sep. 24, 1985

[54] BRAKE DEVICE FOR COAXIAL REEL TAPE RECORDERS

[75] Inventor: David G. Hart, Sarasota, Fla.

[73] Assignee: Fairchild Weston Systems, Inc., Sarasota, Fla.

[21] Appl. No.: 423,329

[22] Filed: Sep. 24, 1982

[51] Int. Cl.[4] .................. G11B 15/32; B65H 23/06
[52] U.S. Cl. .............................. 242/193; 242/75.4
[58] Field of Search ............ 242/193, 194, 204, 75.43, 242/75.44, 75.40, 156.2; 188/70 R, 75, 74, 76, 71.1

[56] References Cited

U.S. PATENT DOCUMENTS

| | | | |
|---|---|---|---|
| 3,052,421 | 9/1962 | Fischer | 188/74 X |
| 3,173,623 | 3/1965 | Schoebel | 242/194 X |
| 3,995,789 | 12/1976 | Carle | 242/193 |
| 4,079,899 | 3/1978 | Vogel | 242/204 X |
| 4,310,131 | 1/1982 | Althuber et al. | 242/204 |
| 4,327,881 | 5/1982 | Fohl | 242/107.2 |

Primary Examiner—Stuart S. Levy
Assistant Examiner—David Werner
Attorney, Agent, or Firm—Dale Gaudier

[57] ABSTRACT

A brake apparatus is provided for tape recorders, particularly of the coaxial reel type, in which a single brake pad, mounted on a brake arm, engages a pair of adjacent coaxially disposed drive wheels for coaxial tape reels. The brake arm is biased by a spring into braking engagement with the drive wheels. A solenoid is operable to withdraw the brake arm, thereby disengaging the brake, when energized. The solenoid is controlled to be energized whenever a drive motor for the tape reels is powered, and to be deenergized when the drive motor is not powered. The disclosed structure provides automatic braking for the tape reels whenever the drive motor loses power or is shut off, thus providing positive mechanical braking both in a power loss condition and in a parking condition for the tape reels.

3 Claims, 4 Drawing Figures

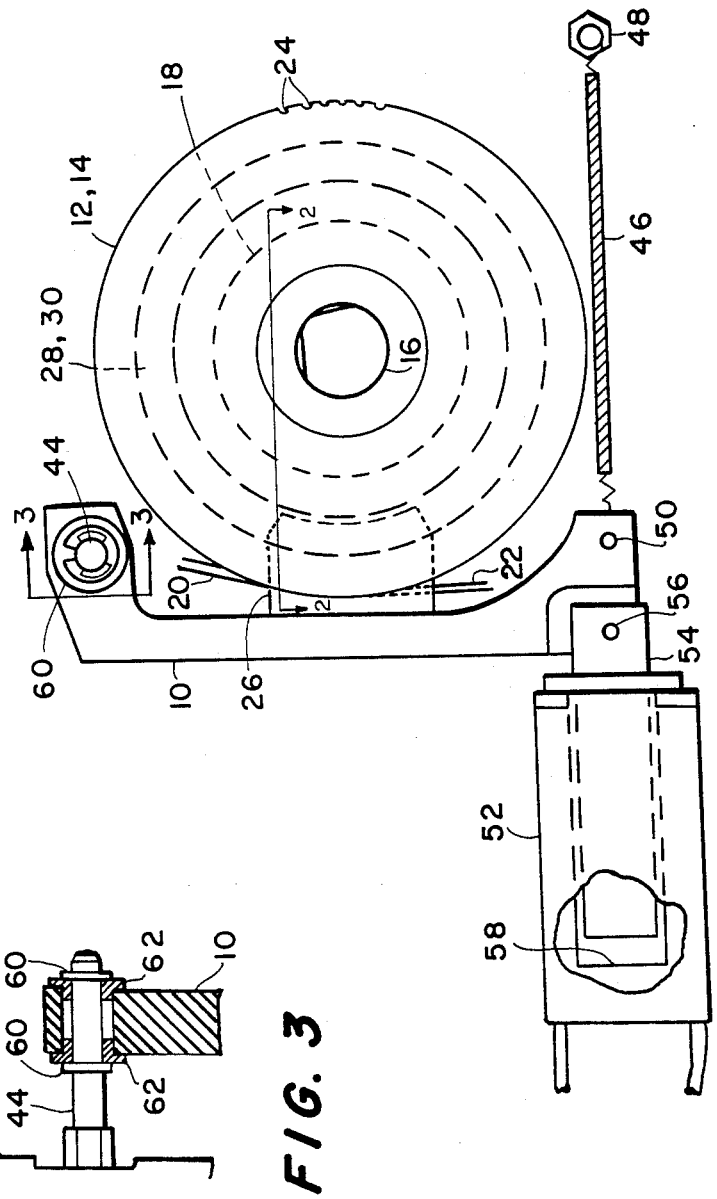
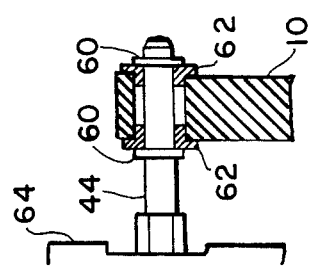

BRAKE DEVICE FOR COAXIAL REEL TAPE RECORDERS

TECHNICAL FIELD

This invention relates to brake devices for tape recorders, and more specifically to brake devices for coaxial reel tape recorders.

BACKGROUND ART

In the tape recorder art it is known to provide brake means to stop rotation of tape reels for various reasons. Such brakes are also known for coaxial reel tape recorders.

However, in the coaxial reel environment, as well as in other environments wherein space is at a premium, prior art brake systems are unduly consumptive of limited amounts of space. For example U.S. Pat. No. 3,995,789 to Carle discloses a brake structure incorporating a brake 44 for frictional engagement with the peripheries of hubs 28 and 30 of the two tape reels. The brake is activated by feeler means provided to detect the quantities of tape present on the two reels, and is mounted on the same side of the transport chassis as the reels, thus utilizing additional space thereon, needlessly making the transport more bulky. There is thus a need in the prior art for space efficient placement of brake devices in environments wherein space is at a premium, such as tape recorders utilizing large reels illustrated by the coaxial type of tape transport.

Moreover, in order to prevent tape spillage from the reels of such devices due to sudden power loss for the transport motor or motors thereof, or due to a vibration experienced by the device due to environmental conditions during an inoperative state thereof, there is a need in the prior art for brake devices to assure reel stoppage in the event of power loss, as well as during non-powered, inoperative conditions.

DISCLOSURE OF THE INVENTION

It is accordingly an object of the present invention to provide a braking apparatus for a tape recording device to brake movement of the tape reels when the driving motors therefor are unpowered.

It is another object of the invention to provide a brake device for a tape recorder which is conservative of space on the reel side of a chassis.

Still a further object of the invention is the provision of a brake device for a tape recording apparatus which does not interfere with placement of tape reels thereon.

It is another object of the invention to provide a single brake device for braking movement of two coaxial tape reels on a tape recorder by application of a braking force to drive wheels for the reels.

A more specific object of the invention is the activation of a single brake device for engagement with a pair of drive wheels for driving tape reels of a tape recorder when no power is applied to the driving motors thereof.

In accordance with these and other objects of the invention, there is provided a braking apparatus for a tape recording device having a pair of tape carrying reels mounted on rotating drive shafts therefor, in which a pair of adjacent driven rotating members engage the drive shafts for transmitting a force thereto from at least one prime mover. The apparatus specifically includes a single brake device for selective frictional braking engagement with both of the driven members. Activating means and deactivating means are provided for activating and withdrawing the single brake means to and from frictional engagement with the driven members.

Other features of the invention include the use of a mechanical biasing means, in the form of a spring, for urging the single brake against both the driven members, and an electrically powered component for withdrawing the brake, the component being arranged to receive power if and only if power is also applied to the prime mover for the tape reels.

Preferably, the tape carrying reels of the tape recorder are coaxially mounted on coaxial drive shafts and the driven rotating members are comprised of a pair of adjacent drive wheels. The single brake is comprised of a self-aligning structure which includes a brake pad having a pair of braking surfaces. The braking surfaces are oriented for frictionally engaging corresponding faces on the adjacent drive wheels. The faces on the drive wheels are preferably angled to form a chamfer therebetween, and the braking surfaces of the brake pad are oriented to contact both the chamferred faces in order to apply simultaneous braking to both drive wheels for the tape reels.

Still other features of the invention include the use of a pivoted brake arm, on which the brake pad is mounted, for rotation towards and away from engagement with the drive wheels, in response to the biasing spring (urging rotation towards the wheels) and a solenoid (urging the brake arm to pivot away from the drive wheels). Where the prime mover is comprised of an electrical motor, the motor is arranged in circuit with the solenoid so that electrical power is provided and withdrawn substantially simultaneously to both the motor and the solenoid, thus deactivating the solenoid whenever electrical power is removed from the motor thereby permitting the brake arm to respond to the biasing spring and to engage the brake pad with the drive wheels.

In accordance with a more specific aspect of the invention, there is provided a brake structure for braking a coaxial reel tape recorder whenever the driving motor therefor is not powered. The brake structure includes adjacent, transversely displaced drive wheels for the tape recorder reels and a single brake arm mounted for movement towards and away from the drive wheels. Braking surfaces are associated with the brake arm for substantially simultaneous frictional engagement with the drive wheels in response to movement of the brake arm towards the wheels. A spring is connected at its one end to the brake arm and is fixed at its other end, for urging the brake arm towards the drive wheels in order to provide the desired frictional braking engagement between the braking surface on the arm and the drive wheels. A solenoid includes a plunger in contact with the brake arm and operable in opposition to the spring for withdrawing the brake arm and its braking surfaces from the frictional braking engagement with the drive wheels. A control structure deactivates the solenoid, thereby permitting frictional braking engagement of the brake arm with the drive wheels, whenever a drive motor for the coaxial reels is not powered.

The invention further includes a brake pad on the single brake arm, the brake pad having the brake surfaces thereon. The drive wheels are provided with frustoconical surfaces, and the brake pad is provided with matching braking surfaces for engaging the frustoconical surfaces of the drive wheels. Preferrably, the brake arm is pivoted about a pivot pin for rotational movement towards and away from the drive wheels in response to the respective deactivation and activation of the solenoid. Moreover, the brake pad is preferably located on the brake arm intermediate the pivot point thereof and a distal connection of the spring and solenoid plunger thereto.

The solenoid and spring may be connected to the brake arm at essentially the same displacement from the pivot pin, and the brake arm may be mounted on the pivot pin by a pair of grip rings.

Still other objects and features of the present invention will become more readily apparent to those skilled in the art from the following description when read in conjunction with the accompanying drawing, wherein there is shown and described a preferred embodiment of the invention simply by way of illustration of one of the best modes contemplated for carrying out the invention. As will be realized, the invention is capable of other, different, embodiments and its several details are capable of modifications in various obvious aspects, all without departing from the invention. Accordingly, the drawings and descriptions will be regarded as illustrative in nature and not as restrictive.

BRIEF DESCRIPTION OF THE DRAWING

The accompanying drawings, incorporated in and forming a part of the specificaiton, illustrate several aspects of the present invention, and, together with the description, serve to explain the principles of the invention. In the drawings:

FIG. 1 shows the present invention;

FIG. 3 shows a detail view of a section taken at section line 3—3 in FIG. 1.

BEST MODE FOR CARRYING OUT THE INVENTION

Figure 2:
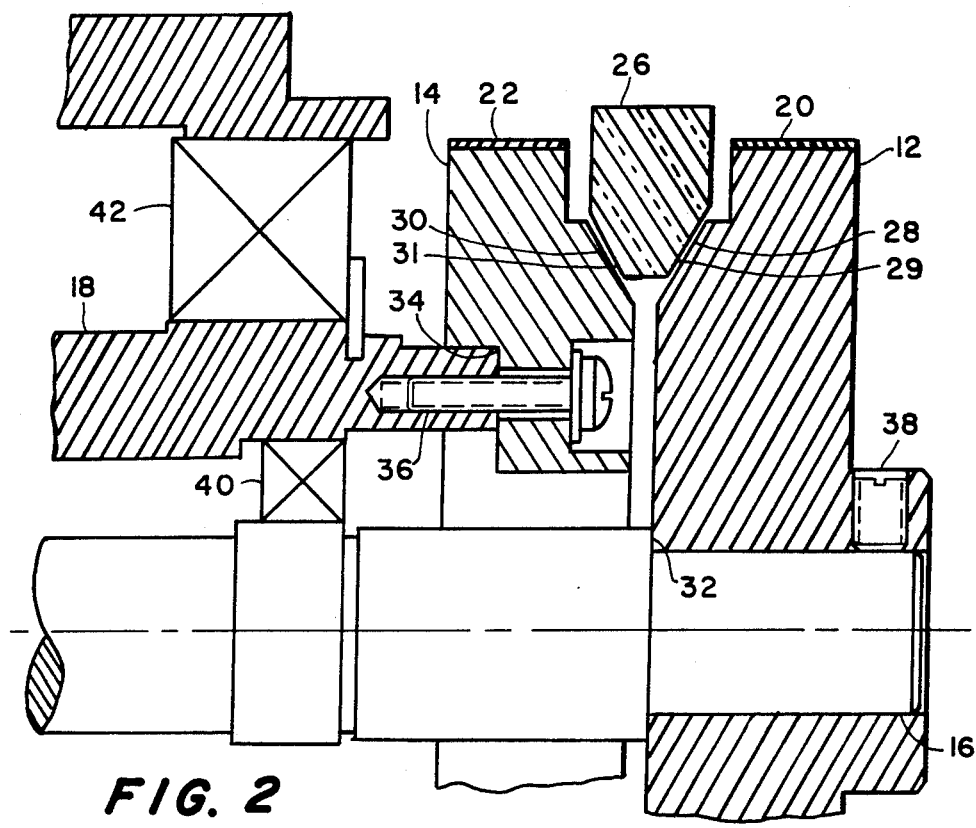
FIG. 2 illustrates a sectional view of the invention taken along section line 2—2 of FIG. 1.

Referring now to FIG. 1, a preferred embodiment of the invention is shown as including a brake arm 10 for a pair of drive wheels 12 and 14. The drive wheels are displaced from each other in a direction perpendicular to the plane of the drawing of FIG. 1, as is apparent upon reference to FIG. 2, illustrating a sectional view through lines 2—2 in FIG. 1. The two drive wheels are mounted on a pair of coaxially disposed drive shafts 16 and 18, the latter being shown only symbolically by a dashed line at FIG. 1.

Drive shafts 16 and 18 extend leftwardly of FIG. 2 through a chassis plate (not shown) to provide mounting structure for a pair of tape reels on the other side of the plate. The drive wheels are driven by one or more electrical motors (not shown) to provide torque to the coaxial drive shafts for transmission to the tape reels on the other side of the chassis plate.

It is appreciated that the drive wheels may be differently disposed with relation to the two drive shafts. For example, the drive wheels may be in frictional peripheral driving engagement with the two shafts, and may be directly driven by one or more motors or coupled to output shafts of such motors. In the preferred embodiment the drive wheels are concentrically mounted on the drive shaft, however.

The concentric drive wheels 12 and 14 may be driven by electrical motors either by direct engagement, by a geared engagement, or, as is shown in the figures, by a belt drive. Towards that end, drive wheel 12 is seen to be driven by a drive belt 20 and drive wheel 14 is driven by a drive belt 22. For accurate speed and position control, the belts 20 and 22 are preferably timing belts having a plurality of ridges thereon for engaging a corresponding plurality of grooves in the drive wheels, shown at 24.

Brake arm 10 includes thereon a brake pad 26, movable with the brake arm for frictional engagement of wheels 12 and 14 to provide a braking action therefor. As is seen in FIG. 2, wheels 12 and 14 are provided with a pair of braking surfaces 28 and 30 for engaging a corresponding pair of brake surfaces 29,31 on brake pad 26. By virtue of the angled braking surfaces 28 and 30, and the corresponding angular orientation of the mating brake surfaces 29,31 to the brake pad, there is provided a self-adjusting feature of the present invention, wherein a downward displacement of the brake pad as seen in FIG. 2 leads to appropriate lateral displacement, as needed, to assure simultaneous frictional engagement with surfaces of both drive wheels.

Such a chamferred effect is achieved by the use of frustoconical surfaces on wheels 12 and 14. to cooperate with the brake pad, and a corresponding provision of surfaces shaped in the form of segments of a frustum of a cone on brake pad 26.

It is thus seen that the inventive structure provides braking force for tape reels by frictional engagement of a single brake pad with two drive wheels therefor. Such an arrangement is economical and moreover does not require the installation of complex devices on the tape reel side of the recorder chassis. Instead, the braking is effected at the rearward side of the chassis, where space allocation is not as significant a problem as on the crowded frontward side thereof.

The mechanical arrangement of the drive wheels and drive shafts is more readily observed from FIG. 2, wherein it is seen that a first shoulder 32 is provided on drive shaft 16 to provide longitudinal positioning and alignment of drive wheel 12. A step 34 is formed in drive wheel 14 to provide similar alignment thereof with respect to the outer drive shaft 18. Wheel 14 is mounted to drive shaft 18 by means of fasteners 36, which may be screws for example. On the other hand, drive wheel 12 is connected to the inner shaft 16 by means of a set screw 38. Ball bearings 40 and 42 are provided to permit independent rotation of shafts 16 and 18 which, as previously mentioned, are connected to the tape reels on the more crowded side of the chassis plate.

In view of the above described coupling, it is seen that application of brake pad 26 surfaces 29,31 to the cooperating braking surfaces 28, 30 of wheels 12 and 14 causes braking of the tape reels (not shown) when in motion, and a locking of the tape reels in a "parked" condition when the tape reels are not in rotation.

The mechanism for application of brake pads 26 to the drive wheels is best appreciated from reference to FIG. 1, wherein it is seen that brake arm 10 is mounted on, and pivoted about, a pivot pin 44.

The brake arm is urged radially towards wheels 12 and 14 by a spring 46, one end of which is fixed as seen at 48, the other end of which is connected at 50 to a distal portion of brake arm 10. Thus, absent any countervailing force, spring 46 activates the braking device of the present invention by pulling the brake arm 10 towards the drive wheels to cause contact between the two sets of cooperating braking surfaces provided therein.

A deactivating element for the inventive braking device is provided to counteract the effects of spring 46. The deactivating element specifically includes a solenoid 52 having a plunger 54 attached ro brake arm 10 by a pin 56. The solenoid includes a seat 58 for plunger 54 such that, when powered, plunger 54 is seated thereagainst. The solenoid and spring are appropriately chosen so that the pull-in force generated by solenoid 52 exceeds the spring tension of spring 46, thus overcoming the force exerted thereby on brake arm 10 and displacing brake pad 26 radially outwardly from braking surfaces 28 and 30. When the solenoid 52 is not powered, spring 46 attracts brake arm 10 to provide the above described braking action against drive wheels 12 and 14.

It should be appreciated that the spring and solenoid may both be on the same side of the brake arm, as follows. Spring 46 may be provided on the side of the arm now occupied by solenoid 52. Where a compressive spring is used instead of a tensile spring, operation of the system could proceed as previously described. Alternatively, if a solenoid operable by outward displacement of its plunger 54 were used on the same side of the brake arm 10 now occupied by spring 46, system operation would again remain substantially unchanged. It should also be appreciated that the spring and solenoid, although preferrably attached to brake arm 10 at substantially identical radial displacements from pivot pin 44, may be attached to the arm at different radial displacements. A relationship between the pull-in force of the solenoid and the tensile force of the spring different from that previously described would then be effective in operating the present braking system.

A further advantage of the present system is seen by reference to FIG. 3. As shown therein, brake arm 10 may be mounted on pin 44 by means of a pair of grip rings 60. Bushings 62 may be used to provide proper seating for the brake arm on the pivot pin 44, which is mounted on a fixed support platform 64 therefor.

The mounting arrangement for brake arm 10 on pivot pin 44 provides self alignment of the arm during assembly thereof, and allows the brake arm to be quickly, precisely and inexpensively located on the pivot pin.

Figure 4:
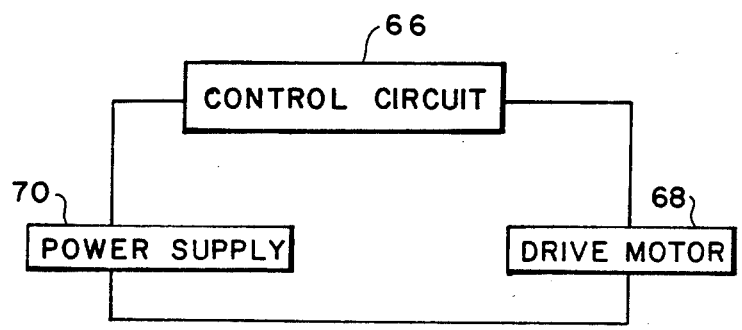
FIG. 4 shows a circuit diagram illustrating operational control of the invention.

A significant feature of the present invention is the automatic application of brake pad 26 to drive wheels 12 and 14 in the event of a loss of power by the motors driving the wheels in order to effect braking of the tape reels. This feature is achieved by providing a control circuit for solenoid 52 as shown in FIG. 4. In FIG. 4 there is symbolically indicated the provision of a control circuit 66 in a series circuit arrangement with a drive motor 68 as used to rotate drive wheels 12 and 18. The series circuit of control circuit 66 and drive motor 68 is provided with electrical energy by a power supply 70.

Control circuit 66 symbolizes an arrangement for controlling activation of solenoid 52. This arrangement may be as simple as an electrical connection of the terminals of the solenoid in series with the drive motor, or may be a more complex arrangement. For example, there may be provided a current sensor in series with the drive motor 68 to detect current flow therethrough. Output signals from control circuit 66 may be used to activate solenoid 52 whenever drive motor 68 is conducting current, and to deactivate the solenoid when no current is passing through the drive motor. Circuit 66 may further include a number of switches utilized to provide separate control signals for the solenoid, for example to deenergize the same under a predetermined set of conditions so that braking may be applied to the drive wheels even when current flows through the drive motor. Other arrangements applicable to control the solenoid 52 in accordance with the foregoing description will similarly occur to those of ordinary skill in the art.

In accordance with the arrangement shown in FIG. 4, it will thus be appreciated that if current stops flowing through drive motor 68 for any reason, whether because power supply 70 fails, drive motor 68 is turned off, or because of the presence of other conditions, solenoid 52 will be deenergized, thereby permitting brake arm 10 to respond to the force exerted by spring 46 to brake rotation of drive wheels 12 and 14. Similarly, unless a switching circuit is provided at 66 to permit selective deenergization of solenoid 52, whenever power is applied to motor 68 solenoid 52 will be energized, thereby deactivating the braking device of the present invention. Thus, if drive motor 68 ceases to draw current during operation of the tape transport, the tape reels thereof will be braked and will not continue to free-wheel. Such automatic braking prevents the tape transport from throwing a loop in response to such a condition.

Further, in an inoperative or shut down state, it is known that environmental vibrations typically tend to cause tape reels of a transport to undergo slight rotations, thus leading to further potential tape spillage therefrom. With the present invention, positive braking is applied to the reels when the transport is in a shut down state, to prevent such rotation and tape spillage. The present invention thus provides secure tape engagement in non-operative states.

It should be recognized, however, that the inventive system is preferrably operable along with a separate braking system for speed and position control of the tape reels. Typical precise positioning and speed control of the tape may be had by the use of servomechanisms associated with the drive motor. as well as with dynamic braking provided therefor. Thus, during a power outage occurring during operation of the drive motor, for example, dynamic braking is more effective than frictional braking for rapid reduction of high tape speed. However, once tape speed is reduced to be below a predetermined rate, such as $1\frac{1}{8}$ IPS, for example, it is known that dynamic braking is essentially ineffective. The present invention thus provides positive braking even at low operating speeds. Additionally, as is clearly understood, when the tape transport is stopped and the drive motor is not operative, no dynamic braking is available to prevent environmentally induced reel rotation. The present invention, however, by providing positive mechanical braking during parking and inactive periods, overcomes such difficulties.

Although the invention is not limited to any specific materials for drive wheels 12 and 14 and the braking surfaces 28 and 30 thereof, preferably the drive wheels and chassis housing are formed of sand cast aluminum, and the frustoconical surfaces 28 and 30 are machined, irridited aluminum surfaces. Alternatively, a more roughened surface may be bonded onto the frustoconical portions of the drive wheels. The brake pad may be entirely formed of polyurethane rubber, or may include polyurethane rubber layers on braking surfaces 29 and 31 thereof. Moreover, the two braking surfaces 29 and 31 may be separately attached to brake arm 10, although the use of a single pad for mounting the braking surfaces is preferrable.

There has thus been shown by way of illustration a braking device for a tape recorder having a single brake pad operable with the drive wheels for the tape reels in order to apply positive frictional braking to the drive wheels when the drive motor therefor is not electrically powered.

The foregoing description of the preferred embodiment of the invention has been presented for purposes of illustration and description. It is not intended to be exhaustive or to limit the invention to the precise form disclosed, since many obvious modifications and variations are possible in light of the above teaching. The embodiment described was chosen in order best to explain the principles of the invention and its practical application, thereby to enable others skilled in the art best to utilize the invention in various embodiments and with various modifications as are best suited to the particular use contemplated. It is intended that the scope of the invention be defined by the claims appended hereto, when interpreted to obtain the full breadth to which they are fairly and legally entitled.

I claim:

1. Braking apparatus for a coaxial reel tape recorder comprising:

a pair of tape reels disposed adjacent one another and mounted to a pair of drive shafts disposed concentric each other on one side of a chassis, the drive shafts having portions extending through an opening in the chassis;

a pair of drive wheels disposed adjacent one another and mounted to the portions of the drive shafts which extend through the chassis and on a side opposite from the tape reels with the drive wheels having opposed angled faces together forming a composite chamfered braking surface;

electrical drive means for driving the drive wheels;

a single brake pad arranged adjacent the pair of drive wheels on the side of the chassis opposite the tape reels, the brake pad having complememtary angled faces thereon for engaging the composite chamfered braking surfaces of the drive wheels; and means connected to the brake pad for selectively wedging the angled faces of the brake pad wedge against the composite chamfered braking surfaces of the drive wheels and thereby simultaneously braking both drive wheels.

2. The braking apparatus of claim 1 wherein the means for selectively wedging the brake pad includes:

a solenoid connected electrically in series with the drive means;

an actuating arm having one end connected to the solenoid and carrying the brake pad, and its opposite end mounted to a pivot arranged on the chassis; and means connected to the actuating arm for biasing the brake pad toward the drive wheels, whereby when the drive means is energized the solenoid is energized causing the brake pad to be withdrawn from engagement from the drive wheels, and when the drive means is deenergized the solenoid is deenergized and the biasing means causes the brake pad to frictionally engage and brake both drive wheels.

3. The braking apparatus of claim 2 wherein the angled faces of the drive wheels are frustoconical surfaces.

* * * * *